United States Patent
Park et al.

(10) Patent No.: US 11,484,889 B2
(45) Date of Patent: Nov. 1, 2022

(54) ELECTRIFICATION DEVICE AND ELECTRICAL DUST COLLECTING APPARATUS INCLUDING THE SAME

(71) Applicant: Hanon Systems, Daejeon (KR)

(72) Inventors: Ji-Yong Park, Daejeon (KR); Ki Hong Kim, Daejeon (KR); Jae Ho Kim, Daejeon (KR)

(73) Assignee: Hanon Systems, Daejeon (KR)

( * ) Notice: Subject to any disclaimer, the term of this patent is extended or adjusted under 35 U.S.C. 154(b) by 398 days.

(21) Appl. No.: 16/724,605

(22) Filed: Dec. 23, 2019

(65) Prior Publication Data

US 2020/0206670 A1 Jul. 2, 2020

(30) Foreign Application Priority Data

Dec. 28, 2018 (KR) .......................... 10-2018-0171442

(51) Int. Cl.
  *B03C 3/09* (2006.01)
  *B03C 3/155* (2006.01)
  *B03C 3/12* (2006.01)
  *B01D 46/10* (2006.01)

(52) U.S. Cl.
  CPC ................ *B03C 3/09* (2013.01); *B01D 46/10* (2013.01); *B03C 3/12* (2013.01); *B03C 3/155* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 1,344,330 | A * | 6/1920 | Bradley | B03C 3/47 96/64 |
| 4,602,921 | A * | 7/1986 | Shinohara | B03C 3/38 361/230 |
| 5,456,741 | A * | 10/1995 | Takahara | B03C 3/155 96/57 |
| 7,332,019 | B2 * | 2/2008 | Bias | B03C 3/72 96/26 |
| 8,889,079 | B2 * | 11/2014 | Zahedi | C01B 13/0288 422/171 |
| 10,384,517 | B2 * | 8/2019 | Jee | F24F 8/192 |
| 10,414,247 | B2 * | 9/2019 | Jee | B60H 3/0078 |

(Continued)

FOREIGN PATENT DOCUMENTS

| CN | 1743079 A | 3/2006 |
|---|---|---|
| CN | 1816394 A | 8/2006 |
| CN | 103611630 A | 3/2014 |

(Continued)

*Primary Examiner* — Christopher P Jones
*Assistant Examiner* — Sonji Turner
(74) *Attorney, Agent, or Firm* — Norton Rose Fulbright US LLP; James R. Crawford (57) ABSTRACT

The present invention relates to an electrification device and an electrical dust collecting apparatus including the same capable of adsorbing and filtering fine dust included in air in an air conditioning apparatus such as an air conditioner or an air cleaner, and more particularly, to an electrification device and an electrical dust collecting apparatus including the same capable of improving dust collecting efficiency by performing stable electrification at an accurate position using an electrification electrode in which an electrification pin and an electrode rod are formed integrally with each other.

14 Claims, 9 Drawing Sheets

(56) References Cited

U.S. PATENT DOCUMENTS 10,639,968 B2 * 5/2020 Lofvendahl ............... B03C 3/38
11,161,395 B2 * 11/2021 Shin ........................ B03C 3/86

FOREIGN PATENT DOCUMENTS

| CN | 205253357 U | 5/2016 |
| CN | 106132552 A | 11/2016 |
| KR | 20040007007 A | 1/2004 |

* cited by examiner

ELECTRIFICATION DEVICE AND ELECTRICAL DUST COLLECTING APPARATUS INCLUDING THE SAME

CROSS-REFERENCE TO RELATED APPLICATIONS

This application claims priority under 35 U.S.C. § 119 to Korean Patent Application No. 10-2018-0171442, filed on Dec. 28, 2018, in the Korean Intellectual Property Office, the disclosure of which is incorporated herein by reference in its entirety.

TECHNICAL FIELD

The following disclosure relates to an electrification device and an electrical dust collecting apparatus including the same capable of adsorbing and filtering fine dust included in air in an air conditioning apparatus such as an air conditioner or an air cleaner, and more particularly, to an electrification device and an electrical dust collecting apparatus including the same capable of improving dust collecting efficiency by performing stable electrification at an accurate position using an electrification electrode in which an electrification pin and an electrode rod are formed integrally with each other.

BACKGROUND

An electrical dust collecting apparatus is widely used in an air conditioning apparatus, a humidistat or the like, of a building and a vehicle, and electrifies dust particles to have selected specific electric charges through a corona discharge phenomenon and the collects the dust particles by an electrical attractive force in a dust collecting device.

Figure 1:
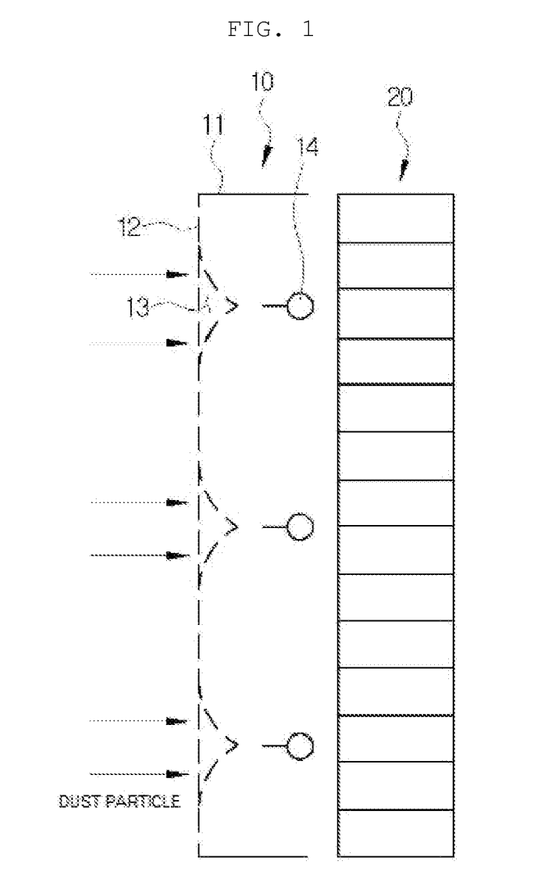
FIGS. 1 and 2 are, respectively, a plan view and a partial cross-sectional view illustrating a dust collecting device of an electrical dust collecting apparatus according to the related art.
Figure 2:
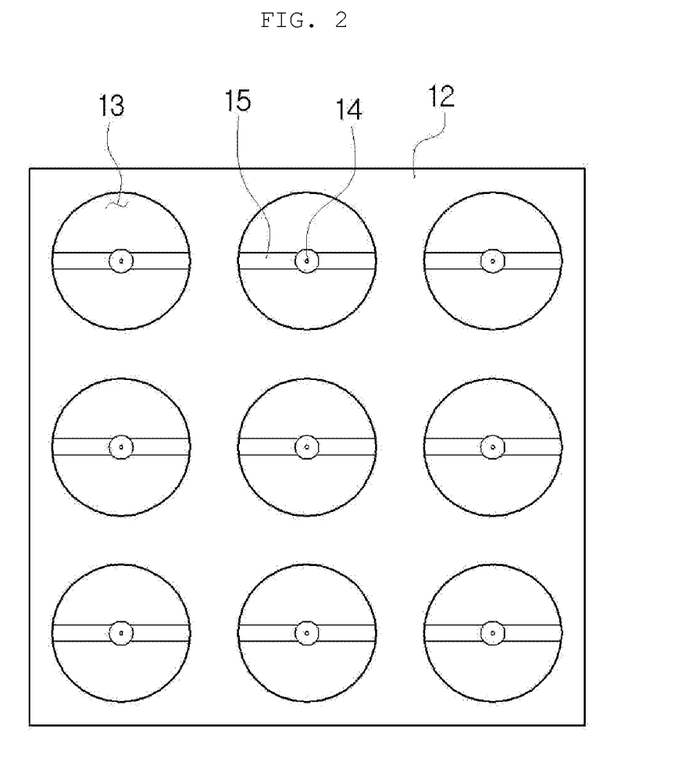

As illustrated in FIGS. 1 and 2, the electrical dust collecting apparatus described above mainly includes an electrification device 10 and a dust collecting device 20. The electrification device 10 includes an electrification frame 11 formed to be hollowed in a direction in which dust is introduced and having a frame shape and an electrification plate 12 fixed to the electrification frame 11 and formed perpendicular to the direction in which the dust is introduced.

The electrification plate 12 includes one or more electrification holes 13 formed to be hollowed in a direction in which dust particles are introduced, and pins 14 applying a high voltage to the dust particles are provided at positions corresponding to the electrification holes 13 to allow the dust particles to have specific electric charges through a corona electrification phenomenon between inner peripheral surfaces of the electrification holes 13 and the pins 14.

The dust collecting device 20 collects the dust particles having the specific electric charges through the electrification in the electrification device 10 as described above by an electrical attractive force using opposite electric charge characteristics.

In this case, the electrical dust collecting apparatus according to the related art generates an electrification phenomenon between the electrification holes 13 of the electrification plate 12 having a plate shape and the pins 14 to allow the dust particles to have the specific electric charges. However, the electrification is generated between the cut electrification holes 13 of the horizontal electrification plate 12 and the pins 14, such that an electrification amount is not uniform depending on a cut state of the electrification holes 13.

In addition, in the electrical dust collecting apparatus according to the related art, the electrification holes 13 are formed in the electrification plate 12 having an area corresponding to that of the electrification frame 11 so as to penetrate through the electrification plate 12 by cutting or the like, as described above. However, a material wasted due to the formation of the electrification holes 13 is generated, which is disadvantageous in terms of material cost.

In addition, the remaining regions of the electrification plate 12 excluding the electrification holes 13 are formed to be blocked in the direction in which the dust is introduced, such that pressure loss is increased.

RELATED ART DOCUMENT

Patent Document (Patent Document 1) Korean Patent Publication No. 10-0495627 (entitled "Electronic Dust Collecting Apparatus using Urethane Filter" and published on Jun. 27, 2005)

SUMMARY

An embodiment of the present invention is directed to providing an electrification device and an electrical dust collecting apparatus including the same in which an electrification electrode in which electrification pins and an electrode rod are formed integrally with each other may be used to improve a manufacturing property and perform uniform electrification, thereby improving dust collecting efficiency.

Further, an embodiment of the present invention is directed to providing an electrification device and an electrical dust collecting apparatus including the same in which electrification holes have a shape in which circles overlap each other in a selected direction, such that a plurality of overlapping circles are formed in one electrification hole, and electrification pins may be provided at accurate positions at the centers of the circles, such that electrification electrodes may be easily implemented to have various sizes and configurations without having a restriction in an area and electrification performance may be improved.

Particularly, an embodiment of the present invention is directed to providing an electrification device and an electrical dust collecting apparatus including the same in which an electrification electrode may be manufactured using one metal plate and be directly mounted on a connection frame or may be fixed to an electrification electrode fixing member and be mounted on a connection frame, both surfaces of an electrode rod in a length direction may be alternately supported by protrusion support portions to improve a mounting property, and electrification pins may be provided at accurate positions even in an environment in which vibrations are generated.

Further, an embodiment of the present invention is directed to providing an electrification device and an electrical dust collecting apparatus including the same in which an electrification plate is formed to have a predetermined height, such that uniform electrification may be performed, and pressure loss of moved air may be minimized.

In one general aspect, an electrification device 100 includes: an electrification frame 111 having a frame shape; an electrification plate 120 coupled to the electrification frame and forming electrification holes 121 hollowed so that dust is introduced; and an electrification electrode 130 in which electrification pins 131 formed at centers of the electrification holes 121 and applying a voltage to dust particles introduced into the electrification plate 120 and an electrode rod 132 connecting the electrification pins 131 to each other are formed integrally with each other.

In this case, the electrification plate 120 may have a predetermined height in a direction in which the dust particles are introduced into the electrification frame 111 and may be bent so that the electrification holes 121 have a shape in which circles overlap each other in a selected direction perpendicular to the direction in which the dust particles are introduced. Particularly, the electrification plate 120 may include overlapping curved portions 120a formed by processing overlapping portions between circumferential surfaces of the electrification holes 121 in a curved form.

In addition, a pair of electrification plate 120 disposed at both sides in the selected direction may be bent to form the electrification holes 121 or one electrification plate 120 may be bent to form the electrification holes 121.

In addition, in the electrification electrode 130, the electrode rod 132 may be lengthily formed in the electrification holes 121 having a shape in which a plurality of circles overlap each other, and a plurality of electrification pins 131 may be formed so as to be positioned at centers, in a radial direction, of the overlapping circles of the electrification holes 121.

In addition, the electrification device for an electrical dust collecting apparatus may further include a fixing frame 112 including hollow portions 112a formed to correspond to the electrification holes 121 of the electrification plate 120 and formed at one side end portion or both ends of the electrification plate 120 in a height direction to fix the electrification plate 120 to the electrification frame 111.

In addition, the electrification device for an electrical dust collecting may further include a connection frame 113 provided with a first seating portion 114 of which both ends are fixed to the electrification frame 111 and on which the electrification electrode 130 is seated and provided with an opening portion 113a formed by opening a predetermined region so that the electrification pin 131 of the electrification electrode 130 is exposed. In this case, the connection frame 113 may include first protrusion support portions 116 alternately supporting both surfaces of the electrode rod 132 in a length direction.

In addition, the electrification device for an electrical dust collecting apparatus may further include a reinforcement support portion 117 connecting between regions in which circles of the hollow portions 112a of the fixing frame 112 overlap each other so as to divide a region of the hollow portions 112a into a plurality of regions and formed integrally with the connection frame 113.

In addition, the electrification device for an electrical dust collecting may further include: an electrification electrode fixing member 140 in which a fixing groove 141 on which the electrification electrode 130 is seated is formed; and a connection frame 113 provided with a second seating portion 114 of which both ends are fixed to the electrification frame 111 and on which the electrification electrode fixing member 140 is seated and provided with an opening portion 113a formed by opening a predetermined region so that the electrification pin 131 of the electrification electrode 130 is exposed.

In addition, the electrification electrode fixing member 140 may include second protrusion support portions 142 alternately supporting both surfaces of the electrode rod 132 in a length direction.

In addition, a first corresponding portion 143 in which a predetermined region of the fixing groove 141 protrudes or is concave may be formed in the electrification electrode fixing member 140, and a second corresponding portion 133 having a form corresponding to that of the first corresponding portion 143 may be formed in the electrification electrode 130.

In addition, the electrification electrode 130 may be formed by one metal plate.

In another general aspect, an electrical dust collecting apparatus 1000 includes: the electrification device 100 as described above; and a dust collecting device 200.

In addition, the dust collecting device 200 may collect the dust particles electrified in the electrification device 100 by an electrical attractive force or may be a filter passing only air therethrough and collecting only the dust particles.

[Detailed Description of Main Elements]

1000: electrical dust collecting apparatus
100: electrification device
111: electrification frame
112: fixing frame
112a: hollow portion
113: connection frame
113a: opening portion
114: first seating portion
115: second seating portion
116: first protrusion support portion
117: reinforcement support portion
120: electrification plate
120a: overlapping curved portion
121: electrification hole
130: electrification electrode
131: electrification pin
132: electrode rod
133: second corresponding portion
140: electrification electrode fixing member
141: fixing groove
142: second protrusion support portion
143: first corresponding portion
200: dust collecting device

DETAILED DESCRIPTION OF EMBODIMENTS

Hereinafter, an electrical dust collecting apparatus 1000 having the configuration as described above will be described in detail with reference to the accompanying drawings.

Figure 3:
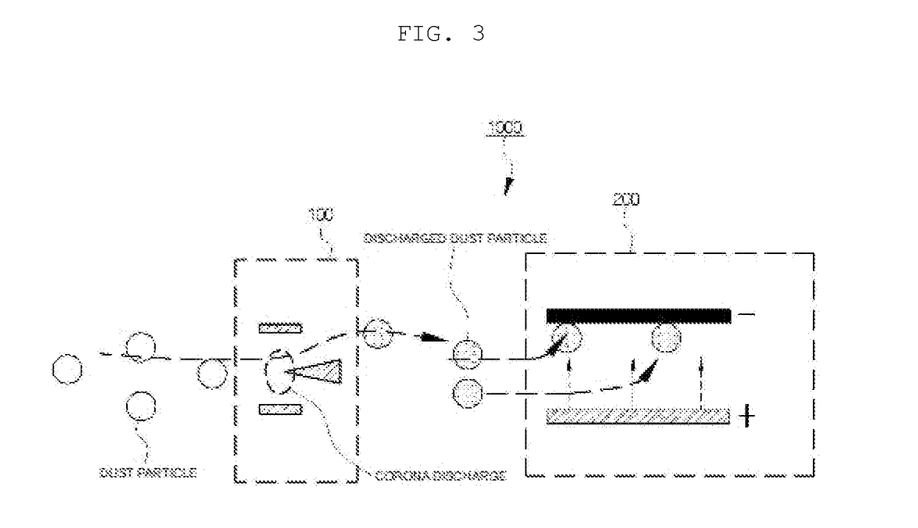
FIG. 3 is a view illustrating an electrical dust collecting apparatus according to the present invention.
Figure 4:
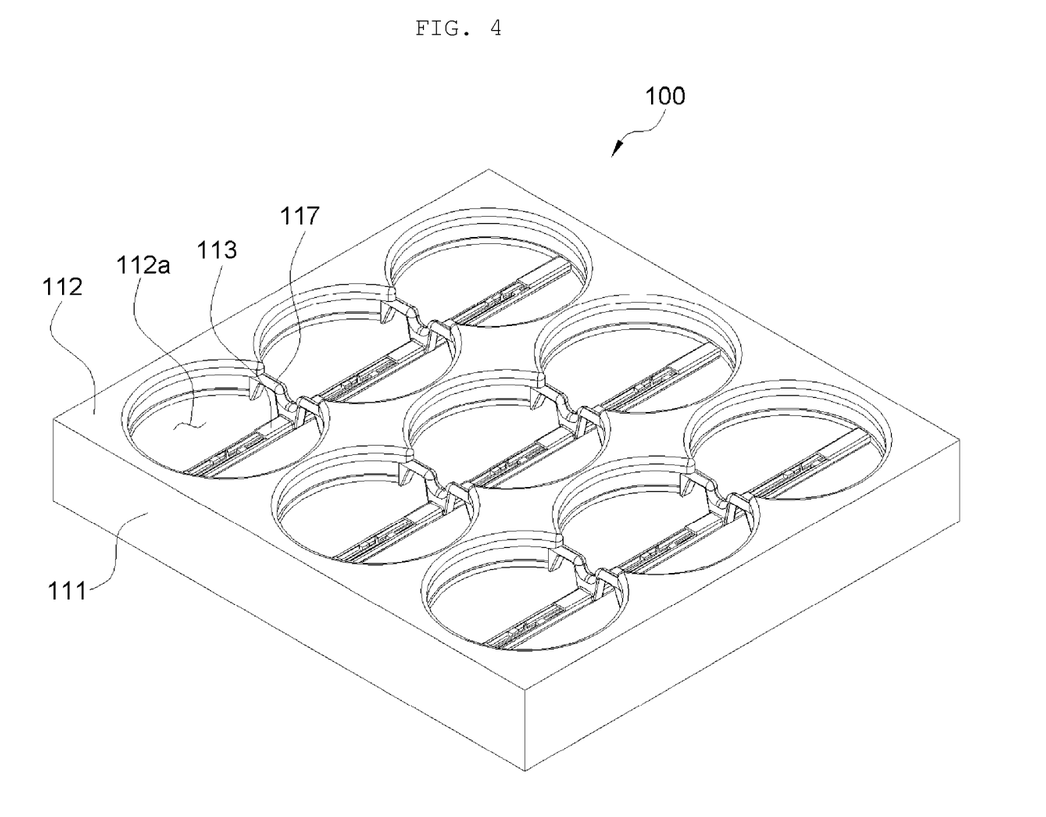
FIGS. 4 to 6 are, respectively, a perspective view, a partially enlarged view, and an exploded perspective view illustrating an electrification device according to the present invention.
Figure 5:
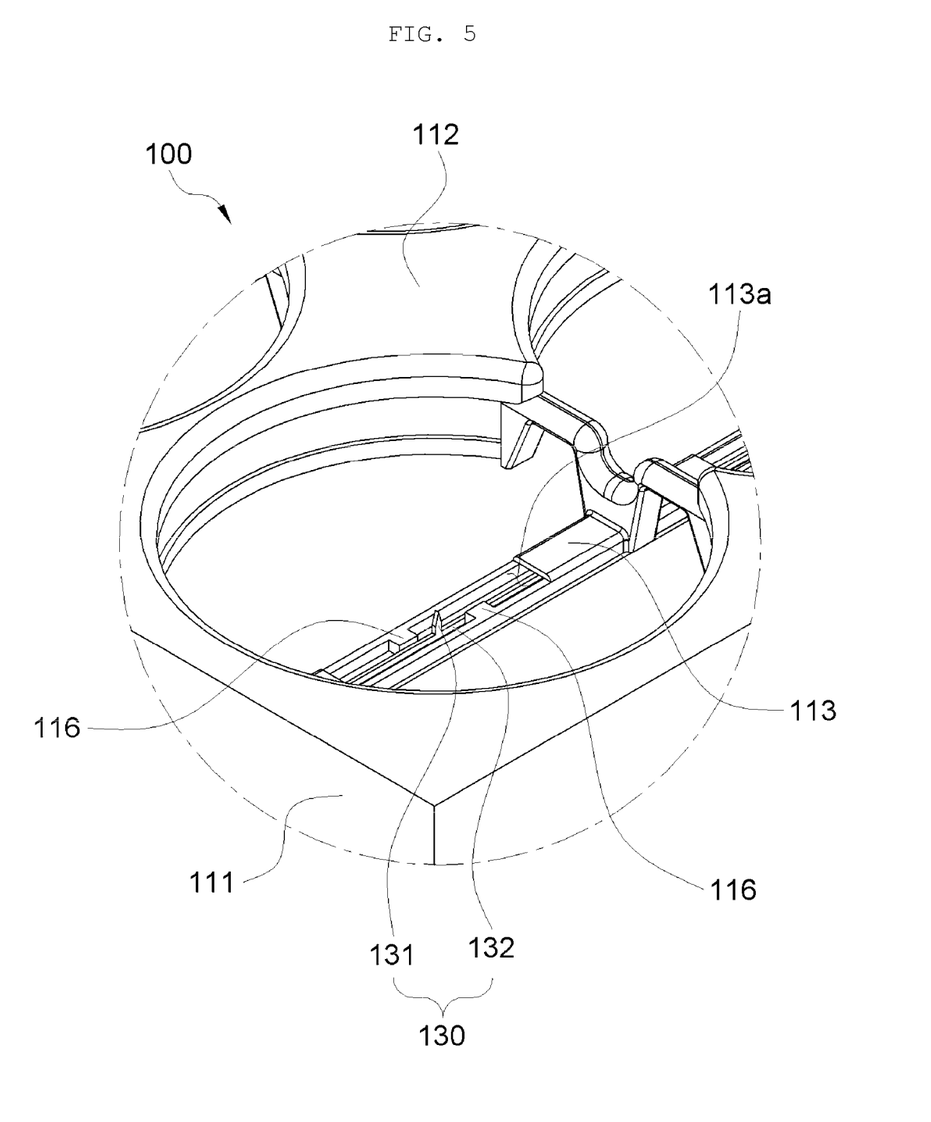
Figure 6:
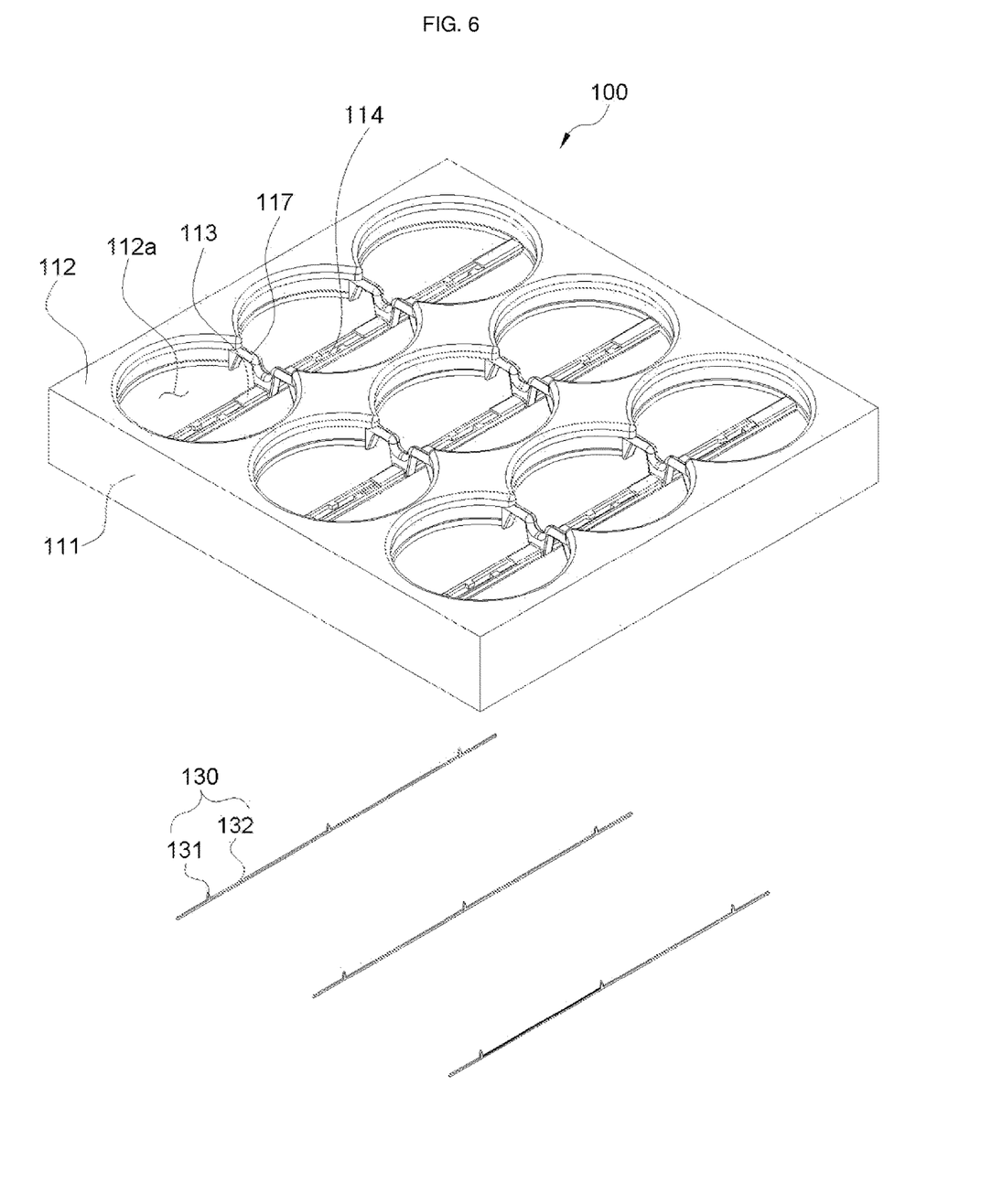
Figure 7:
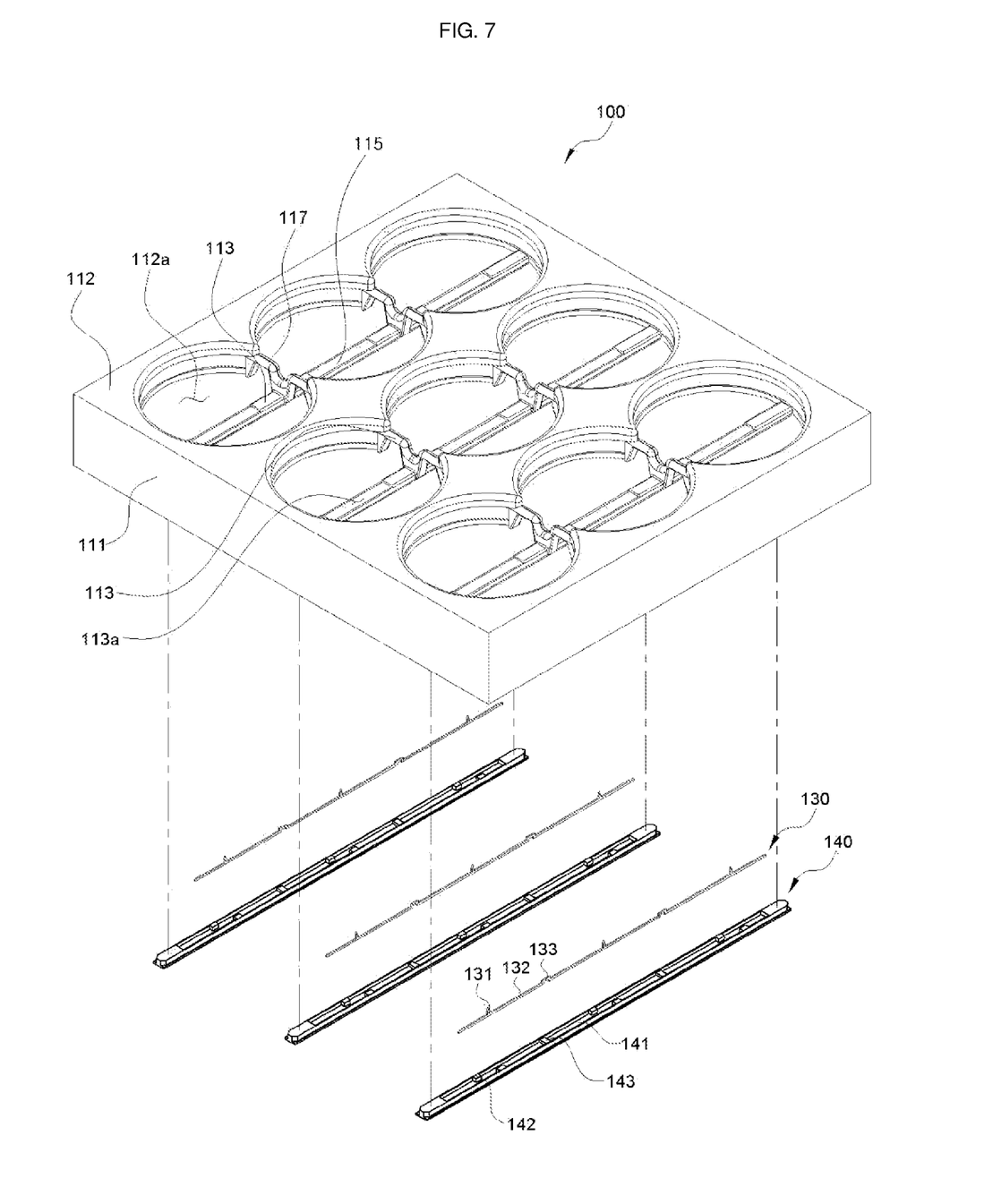
FIG. 7 is another perspective view illustrating an electrification device according to the present invention.
Figure 8:
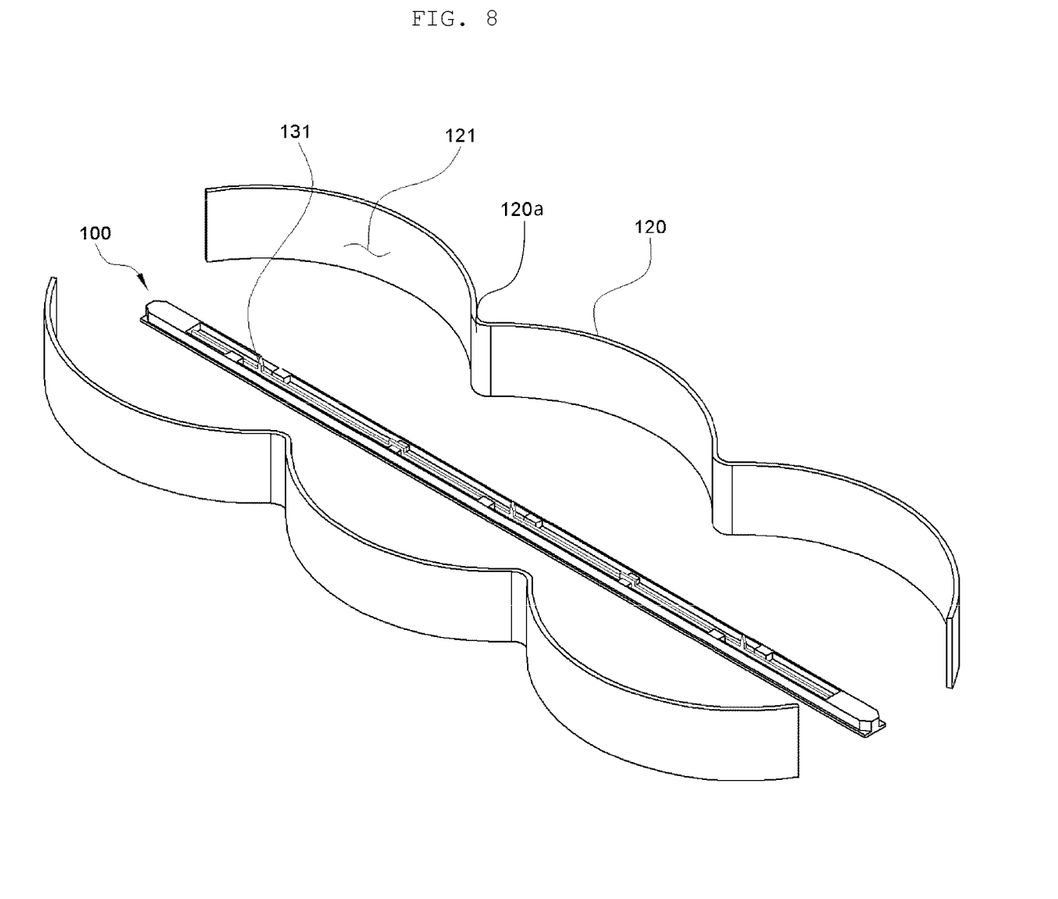
FIGS. 8 and 9 are views illustrating an assembly of an electrification electrode and an electrification electrode fixing member, and an electrification plate according to the present invention.
Figure 9:
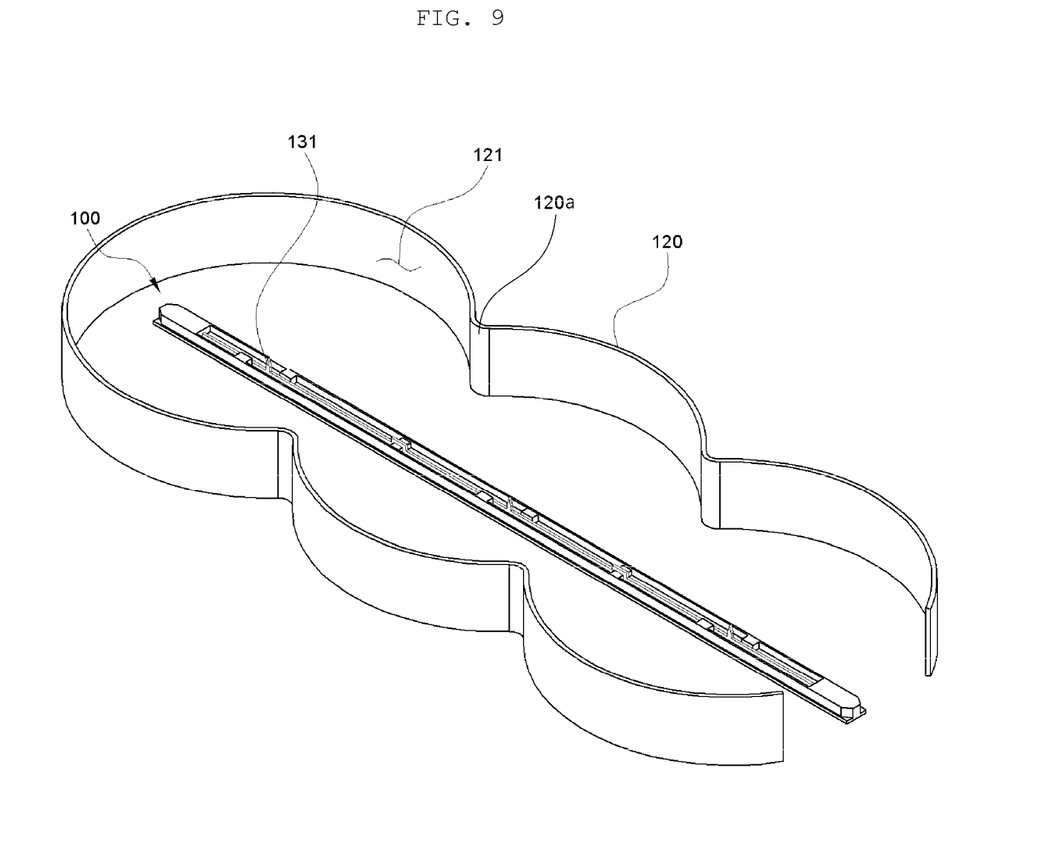

FIG. 3 is a view illustrating an electrical dust collecting apparatus 1000 according to the present invention, FIGS. 4 to 6 are, respectively, a perspective view, a partially enlarged view, and an exploded perspective view illustrating an electrification device 100 of the electrical dust collecting apparatus 1000 according to the present invention, FIG. 7 is another perspective view illustrating an electrification device 100 of the electrical dust collecting apparatus 1000 according to the present invention, and FIGS. 8 and 9 are views illustrating an assembly of an electrification electrode 130 and an electrification electrode fixing member 140, and an electrification plate 120 according to the present invention.

Hereinafter, the electrical dust collecting apparatus according to the present invention having the characteristics as described above will be described in more detail with reference to the accompanying drawings.

As illustrated in FIG. 3, the electrical dust collecting apparatus 1000 according to the present invention includes an electrification device 100 and a dust collecting device 200. The electrification device 100 applies electric charges to dust particles introduced from the outside to electrify the dust particles through a corona electrification phenomenon, thereby allowing the dust particles to have selected electric charge characteristics. First, the dust collecting device 200 may be formed to be capable of collecting the dust particles passing through the electrification device 100 to have the selected electric charge characteristics by an electrical attractive force. In this case, the dust collecting device 200 may be a filter formed of several materials having electrical properties. In addition, second, the dust collecting device 100 may be a filter passing air therethrough and collecting only the dust particles, such as a non-woven filter. In addition, the electrification device 100 and the dust collecting device 200 may be coupled to each other in a direction in which the dust particles are introduced and electrified.

The electrification device 100 of the electrical dust collecting apparatus 1000 according to the present invention will be described in more detail.

The electrification device 100 is configured to include an electrification frame 111, an electrification plate 120, and an electrification electrode 130.

The electrification frame 111, which is a portion forming a basic body of the electrification device 100, is formed in a frame shape. In more detail, an inner portion of the electrification frame 111 is hollowed in the direction in which the dust particles are introduced. A form of the electrification frame 111 will be described in more detail below.

The electrification plate 120 is a portion coupled to the electrification frame 111 to form electrification holes 121 hollowed so that the dust is introduced. Particularly, the electrification plate 120 is formed to have a predetermined height in the direction in which the dust particles are introduced into the electrification frame 111, and the electrification holes 121 have a shape in which circles overlap each other in a selected direction perpendicular to the direction in which the dust particles are introduced. In this case, the electrification plate 120 is formed so that a plurality of electrification holes 121 are connected to each other, and includes overlapping curved portions 120a formed by processing overlapping portions between circumferential surfaces of the electrification holes 121 in a curved form. In a case where sharp shapes are present in the portions in which the electrification holes 121 overlap each other, occurrence of an unnecessary abnormal electrification phenomenon due to the sharp shapes may be prevented by the overlapping curved portions 120a. In this case, it is preferable that the overlapping curved portion 120a is formed at 0.5 mm or more. It is preferable that the electrification plate 120 is formed at a height of 2 mm or more in the direction in which the dust is introduced so that uniform electrification may be generated between the electrification plate 120 and an electrification pin 131. Therefore, in the electrical dust collecting apparatus 1000 according to the present invention, the electrification holes 121 having a form in which a plurality of circles overlap each other may be formed in the electrification frame 111, such that an aperture ratio is increased as compared with the related art, thereby making it possible to minimize loss of an air pressure while air passes through the electrification plate 120. In addition, the electrification plate 120 has a predetermined height in the direction in which the dust particles are introduced, such that the dust particles may be electrified through a corona discharge phenomenon between an inner peripheral surface (electrification hole 121) of the electrification plate 120 and the electrification pin 131. Therefore, uniform electrification is possible, such that electrification efficiency may be improved.

Meanwhile, FIG. 8 illustrates an example in which a pair of plates are bent to form the electrification holes 121, and FIG. 9 illustrates an example in which one plate is bent to form the electrification holes 121. As illustrated in FIGS. 8 and 9, since the electrification holes 121 are formed by bending the plate, a wasted material may be minimized, which is advantages in terms of material cost as compared with the electrification device 100 according to the related art.

In the electrification electrode 130, the electrification pins 131 and an electrode rod 132 are formed integrally with each other. The electrification electrode 130 is a component lengthily formed in the electrification holes 121 continuously formed by the electrification plate 120, and the electrification pins 131 are formed at the centers of the circles formed by the electrification holes 121 to apply a voltage to the dust particles introduced into the electrification holes 121 of the electrification plate 120, and the electrode rod 132 connects the electrification pins 131 to each other. That is, the electrode rod 132 is lengthily formed in the electrification holes 121 having a shape in which a plurality of circles overlap each other, and a plurality of electrification pins 131 are formed to be positioned at the centers, in a radial direction, of the respective circles forming the electrification holes 121 and overlapping each other. In this case, it is preferable that the electrification electrode 130 is formed using one metal plate. Therefore, in the electrification device 100 for the electrical dust collecting apparatus according to the present invention, as compared with a form in which a plurality of electrification pins 131 are individually assembled to the electrode rod 132 and are used, the electrification pins 131 may be formed at accurate positions and production cost and a required time may be reduced. Particularly, in the electrification electrode 130 according to the present invention, the plurality of electrification pins 131 may be provided to one electrode rod 132 to form one line, such that an assembly manhour and material cost may be reduced and the electrical dust collecting apparatus 1000 having stable electrification performance may be manufactured. In this case, the electrification electrode 130 may be formed by processing the plate at a thickness of 0.1 mm to 1.5 mm in a stamping or etching manner. Therefore, in the electrical dust collecting apparatus 1000 according to the present invention, a process of welding individual electrification pins 131, or the like is not required, such that time and cost required for manufacturing the electrical dust collecting apparatus may be reduced and durability may be improved. In addition, the electrification pins 131 may be accurately positioned at the centers of the overlapping circles forming the electrification holes 121 to further improve the electrification efficiency. Meanwhile, in FIGS. 8 and 9, an example in which the electrification holes 121 have a form in which three circles overlap each other and the electrification pins 131 are formed at the centers of the three circles is illustrated and an example in which three electrification holes 121 are formed, such that three electrification electrodes 130 are formed is illustrated, but the present invention is not limited thereto, and the numbers of electrification holes 121 and electrification electrodes 130 may be various depending on sizes or the like of the electrification frame 111 and the electrification plate 120.

In addition, the electrification device 100 may further include a fixing frame 112.

The fixing frame 112, which is a component fixing the electrification plate 120 to the electrification frame 111, has a form of a plate supporting one side or both sides of the electrification plate 120 in the direction in which the dust particles are introduced, and includes hollow portions 112a corresponding to the electrification holes 121 of the electrification plate 120 and formed to be hollowed.

In addition, as illustrated in FIGS. 4 to 6, in the electrical dust collecting apparatus 1000 according to the present invention, a connection frame 113 may be further included in the electrification frame 111, as a component for fixing the electrification electrode 130. The connection frame 113 is provided with a first seating portion 114 of which both ends are fixed to the electrification frame 111 and on which the electrification electrode 130 is seated, and is provided with an opening portion 113a formed by opening a predetermined region so that the electrification pin 131 of the electrification electrode 130 is exposed. That is, in a form illustrated in FIGS. 4 to 6, the electrification electrode 130 is directly seated on the first seating portion 114 of the connection frame 113. In this case, it is preferable that first protrusion support portions 116 supporting both surfaces of the electrode rod 132 are formed at the first seating portion 114 of the connection frame 113. Two or more first protrusion support portions 116 may be formed in a length direction of the electrode rod 132 so as to easily support the electrode rod 132 and be easily mounted, and may alternately support both surfaces of the electrode rod 132 in a state where they are spaced apart from each other by a predetermined distance in the length direction.

Meanwhile, the electrification device 100 may further include a reinforcement support portion 117 formed in the fixing frame 112. The reinforcement support portion 117, which is a portion connecting between regions in which circles of the hollow portions 112a of the fixing frame 112 overlap each other and is formed integrally with the connection frame 113, may connect the fixing frame 112 and the connection frame 113 to each other to improve structural stability, thereby improving durability.

In addition, as illustrated in FIG. 7, in the electrification device 100 of electrical dust collecting apparatus 1000 according to the present invention, the electrification electrode fixing member 140 and the connection frame 113 may be used as components for fixing the electrification electrode 130.

The electrification electrode fixing member 140 is a portion in which a fixing groove 141 on which the electrification electrode 130 is seated is formed, and second protrusion support portions 142 supporting both surfaces of the electrode rod 132 may be formed in the fixing groove 141. Two or more second protrusion support portions 142 may be formed in the length direction of the electrode rod 132 so as to easily support the electrode rod 132 and be easily mounted, and may alternately support both surfaces of the electrode rod 132 in a state where they are spaced apart from each other by a predetermined distance in the length direction. In this case, it is preferable that a first corresponding portion 143 in which a predetermined region of the fixing groove 141 protrudes or is concave is formed in the electrification electrode fixing member 140 so as to seat the electrification electrode 130 at an accurate position and a second corresponding portion 133 having a form corresponding to that of the first corresponding portion 143 is formed in the electrification electrode 130. In FIG. 7, an example in which the first corresponding portion 143 has a form in which it protrudes and the second corresponding portion 133 has a form in which the protruding first corresponding portion 143 may be inserted thereinto is illustrated.

The connection frame 113 is a portion in which a second seating portion 115 on which the electrification electrode fixing member 140 is seated is formed, is lengthily formed and has both ends fixed to the electrification frame 111. In this case, the opening portion 113a is formed in the connection frame 113 by opening the predetermined region so that the electrification pin 131 of the electrification electrode 130 is exposed.

That is, in the electrical dust collecting apparatus 1000 according to the present disclosure, the connection frame 113 is formed to fix the electrification frame 130, and as illustrated in FIGS. 4 to 6, the electrification electrode 130 may be directly seated on the connection frame 113 (the first seating portion 114 may be formed) or even though the electrification electrode 130 is seated on the electrification electrode fixing member 140 the electrification electrode fixing member 140 may be seated on the connection frame 113 (the second seating portion 115 may be formed).

As described above, in the electrical dust collecting apparatus 1000 according to the present disclosure, the electrification electrode 130 in which the electrification pins 131 and the electrode rod 132 are formed integrally with each other may be used to improve a manufacturing property and perform uniform electrification, thereby improving dust collecting efficiency.

In addition, in the electrical dust collecting apparatus 1000 according to the present disclosure, the electrification holes 121 have the shape in which the circles overlap each other in the selected direction, such that a plurality of overlapping circles are formed in one electrification hole 121, and the electrification pins 131 may be provided at accurate positions at the centers of the circles, such that the electrification electrodes 130 may be easily implemented to have various sizes and configurations without having a restriction in an area and electrification performance may be improved.

Therefore, in the electrical dust collecting apparatus according to the present invention, an electrification electrode in which electrification pins and an electrode rod are formed integrally with each other may be used to improve a manufacturing property and perform uniform electrification, thereby improving dust collecting efficiency.

In addition, in the electrical dust collecting apparatus according to the present invention, electrification holes have a shape in which circles overlap each other in a selected direction, such that a plurality of overlapping circles are formed in one electrification hole, and electrification pins may be provided at accurate positions at the centers of the circles, such that electrification electrodes may be easily implemented to have various sizes and configurations without having a restriction in an area and electrification performance may be improved.

Particularly, in the electrical dust collecting apparatus according to the present invention, an electrification electrode may be manufactured using one metal plate and be directly mounted on a connection frame or may be fixed to an electrification electrode fixing member and be mounted on a connection frame, both surfaces of an electrode rod in a length direction may be alternately supported by protrusion support portions to improve a mounting property, and electrification pins may be provided at accurate positions even in an environment in which vibrations are generated.

Further, in the electrical dust collecting apparatus according to the present invention, an electrification plate is formed to have a predetermined height, such that uniform electrification may be performed, and pressure loss of moved air may be minimized.

The present invention is not limited to the abovementioned exemplary embodiments, but may be variously applied. In addition, the present invention may be variously modified by those skilled in the art to which the present invention pertains without departing from the gist of the present invention claimed in the claims.

What is claimed is:

1. An electrification device for an electrical dust collecting apparatus, applying electric charges to dust particles introduced from outside, comprising:
    electrification holes opened in an introduction direction of dust to pass the dust therethrough; and
    an electrification electrode comprising electrification pins formed at centers of the electrification holes and applying the electric charges to the dust particles introduced into an electrification plate; and an electrode rod connecting the electrification pins;
    an electrification frame having a frame shape; and
    the electrification plate forming the electrification holes;
    wherein the electrification plate has a predetermined height in a direction in which the dust particles are introduced into the electrification frame and is bent so that the electrification holes have a shape in which a plurality of circles overlap each other in a selected direction perpendicular to the direction in which the dust particles are introduced; and
    wherein in the electrification electrode, the electrode rod is lengthily formed in the electrification holes having a shape in which a plurality of circles overlap each other, and a plurality of electrification pins are formed so as to be positioned at centers, in a radial direction, of the overlapping circles of the electrification holes;
    the electrification device further comprising a fixing frame including hollow portions formed to correspond to the electrification holes of the electrification plate and formed at one side and portion or both ends of the electrification plate in a height direction to fix the electrification plate to the electrification frame.

2. The electrification device for the electrical dust collecting apparatus of claim 1, wherein the electrification plate includes overlapping curved portions formed by processing overlapping portions between circumferential surfaces of the electrification holes in a curved form.

3. The electrification device for the electrical dust collecting apparatus of claim 1, wherein a pair of electrification plates disposed at both sides in the selected direction are bent to form the electrification holes.

4. The electrification device for the electrical dust collecting apparatus of claim 1, wherein one electrification plate is bent to form the electrification holes.

5. The electrification device for the electrical dust collecting apparatus of claim 1, further comprising a connection frame provided with a seating portion of which both ends are fixed to the electrification frame and on which the electrification electrode is seated and provided with an opening portion formed by opening a predetermined region so that the electrification pin of the electrification electrode is exposed.

6. The electrification device for the electrical dust collecting apparatus of claim 5, wherein the connection frame includes first protrusion support portions alternately supporting both surfaces of the electrode rod in a length direction.

7. The electrification device for the electrical dust collecting apparatus of claim 1, further comprising:
    an electrification electrode fixing member in which a fixing groove on which the electrification electrode is seated is formed; and
    a connection frame provided with a seating portion of which both ends are fixed to the electrification frame and on which the electrification electrode fixing member is seated and provided with an opening portion formed by opening a predetermined region so that the electrification pin of the electrification electrode is exposed.

8. The electrification device for the electrical dust collecting apparatus of claim 7, wherein the electrification electrode fixing member includes a protrusion support portions alternately supporting both surfaces of the electrode rod in a length direction.

9. The electrification device for the electrical dust collecting apparatus of claim 8, wherein wherein a first corresponding portion in which a predetermined region of the fixing groove protrudes or is concave is formed in the electrification electrode fixing member, and a second corresponding portion having a form corresponding to that of the first corresponding portion is formed in the electrification electrode.

10. The electrification device for the electrical dust collecting apparatus of claim 5, further comprising a reinforcement support portion connecting between regions in which circles of the hollow portions of the fixing frame overlap each other so as to divide a region of the hollow portions into a plurality of regions and formed integrally with the connection frame.

11. The electrification device for the electrical dust collecting apparatus of claim 1, wherein the electrification electrode is formed by one metal plate.

12. An electrical dust collecting apparatus comprising:
    the electrification device of claim 1; and
    a dust collecting device collecting the dust particles electrified in the electrification device by an electrical attractive force.

13. The electrical dust collecting apparatus of claim 12, wherein the dust collecting device is a filter passing only air therethrough and collecting only the dust particles.

14. The electrification device for an electrical dust collecting apparatus of claim 7, further comprising a reinforcement support portion connecting between regions in which circles of the hollow portions of the fixing frame overlap each other so as to divide a region of the hollow portions into a plurality of regions and formed integrally with the connection frame.

* * * * *